United States Patent [19]

Diehl

[11] Patent Number: 4,810,132

[45] Date of Patent: Mar. 7, 1989

[54] PIPE TENSIONER MACHINE

[76] Inventor: Ottmar K. Diehl, Ebertsheimer Strasse 57, D-6719 Eisenberg, Fed. Rep. of Germany

[21] Appl. No.: 72,651

[22] Filed: Jul. 13, 1987

[51] Int. Cl.$^4$ ............................................. B63B 35/04
[52] U.S. Cl. .................................... 405/166; 226/195; 405/158; 405/165
[58] Field of Search ............... 405/165, 166, 167, 168; 226/25, 35, 108, 188, 195, 42, 109, 24; 242/54 R

[56] References Cited

U.S. PATENT DOCUMENTS

| | | | |
|---|---|---|---|
| 3,372,461 | 3/1968 | Tesson | 405/168 X |
| 3,658,222 | 4/1972 | Dressel et al. | 405/167 X |
| 3,685,306 | 8/1972 | Mott | 405/168 |
| 3,855,835 | 12/1974 | Tisdale | 405/168 X |
| 4,157,023 | 6/1979 | Tisdale et al. | 405/168 X |
| 4,521,132 | 6/1985 | Isakson et al. | 405/165 X |

Primary Examiner—Dennis L. Taylor
Attorney, Agent, or Firm—Miller & Gibbons

[57] ABSTRACT

A pipe tensioner machine for off-shore pipe laying operations having adjustable squeeze elements for the transfer of tension to the pipes comprises four tensionbanks orientated in an angle of substantially 90° to each other and adjustable by an adjustment device mounted within a frame structure. The tension banks are moveable along guides, said guides having an inclination with respect to the horizontal of substantially 22.5°. The tensionbanks comprise revolving tracks supported by rollers which in turn are supported in groups by levers.

9 Claims, 6 Drawing Sheets

PIPE TENSIONER MACHINE

The invention relates to a pipe tensioner machine for maintaining a predetermined tension of the pipe string between pipe laybarge and seafloor during offshore pipelay operation. In offshore pipelaying operations the pipe string between laybarge and seafloor has to be kept taut to prevent overdue stress and buckling. The tension has to be maintained during all barge movements. For processing the pipe aboard the laybarge, the pipe string has to be kept steady, i.e. the pipe tension has to be kept within certain limits to compensate for the various sea conditions. The pipe string is squeezed between track loops or wheels which are propelled and controlled automatically.

A known pipe tensioner machine of this kind employs two tension-banks having a V-shaped profile for squeezing the pipe from both sides. This device includes a number of shortcomings and disadvantages. As the pipe is always held at the centerline of the V-shaped profile a level adjustment of the pipeline support or the machine itself is to be made for every different pipe diameter. Therefore, a power failure standby equipment is needed to maintain the necessary squeeze force. Since the pipe is only squeezed on two sides, the squeeze force may deform large diameter pipes resulting in cracked concrete.

Another known device uses an upper and lower track assembly, each ssupported in a main frame assembly. Airbag actuated rollers within the track loops apply squeeze force on the tracks. Each track assembly consists of two roller chain rails supporting V-shaped crossties. Two adjustable solid rubber pads on each crosstie support the pipe. A serious handicap of this machine is the downtime caused by the necessary changeover from one pipe diameter to another. Numerous bolts and nuts have to be loosened and refixed for moving each pad to another location of the crosstie. Furthermore, the airbags are very sensitive to concrete particles, oil and grease. For a barge power failure a standby compressor is necessary.

It is the object of the present invention to provide a pipelay tensioner machine which remedies the before-mentioned shortcomings and handicaps.

More specifically it is an object of the present invention to provide a pipelay tensioner machine which needs no level adjustment for the bottom of pipe diameters. It is a further object to provide a pipelay tensioner machine without the necessity for a power failure standby equipment. There should be no danger for a deformation of the pipes leading to concrete cracks. The new pipelay tensioner machine should allow a quick changeover from one pipe diameter to another.

According to the invention, the before-stated object is met by the features in accordance with the mainclaim. With respect to preferred embodiments of the tensioner according to the invention, reference is made to the features of the subclaims.

In accordance with the invention, there are provided four tensionbanks which are provided in an angle of substantially 90° with respect to each other and which are moveable towards each other by an adjustment device held within a frame arrangement. A pipe tensioner machine provided with the features according to the invention, remedies the before mentioned disadvantages and results in a number of further improvements which become more obvious in the course of the following description. An adaptation to different pipe diameters is easily possible since the four squeezing elements may be moved towards and apart from each other by an adjustment device without bolts having to be loosened and refixed or the profile of the squeezing element having to be changed. The force is transferred to the pipe evenly from four sides, so there is no danger of any deformations, even regarding large pipe diameters.

According to a preferred embodiment of the invention, the frame arrangement comprises a main frame wherein the lower tensionbanks are moveably held as well as an upper frame moveably holding the upper two tension banks and the upper frame being adjustable with repsect to the main frame in vertical direction. Thereby an infinite adaptation to practically any pipe diameter is rendered possible. Thus, the tensionbanks are adjustable with respect to each other in horizontal direction as well as in vertical direction.

Preferably the adjustment device for the tension banks comprises guides which are arranged in an angle of 22.5° with respect to the horizontal. Thereby the bottom of pipe is maintained always at the same elevation when changing to a different pipe diameter. An additional level adjustment for the squeeze elements or even the whole machine becomes superfluous.

An advantageous feature of the invention are jackscrews which are in contact with the tensionbanks and by turning of the jackscrews, the tensionbanks are moveable along the guides. Thus, by turning the jackscrews an exact adjustment of the position of the tensionbanks is gained. The vertical posts of the main frame hold jackscrews serving to move the upper frame in relation to the main frame in vertical direction. Thus, also the vertical position of the upper tensionbanks with respect to the lower ones can be precisely adjusted.

A further feature of the invention comprises track loops of the tensionbanks which are being driven by hydraulic motors through gear reducers. Thus, a continuous and steady tension can be maintained at all sea conditions. The tracks are provided with traction pads ensuring a safe grip with the outer surface of the pipes.

In order to support the lower tracks, there are provided track suspension rollers supported in individual groups evenly by a support lever arrangement. Thus, the load is transferred equally to the pipe surface over the whole length of the machine, to avoid any damages. The upper tracks may be moved against the pipe with a predetermined squeeze force. According to the invention the support of the upper tracks is provided by roller groups supported by levers, said levers being supported by a system of two V-arranged hellical springs and a hydraulic cylinder being arranged along the middle line of the V and pivotly hinged to the connecting point of the V-arranged springs. An adjustable hydraulic pressure at the rod end side of the hydraulic cylinder counteracts the resulting compression force of the two springs, thus providing variable squeeze force. At power failure the sole spring force is applied guaranteeing a failsafe grip of the pipe.

Further details, advantages and inventive features become obvious from the following description of the preferred embodiment of the invention with respect to the attached drawings. Following is a brief description of the drawings.

Figure 1:
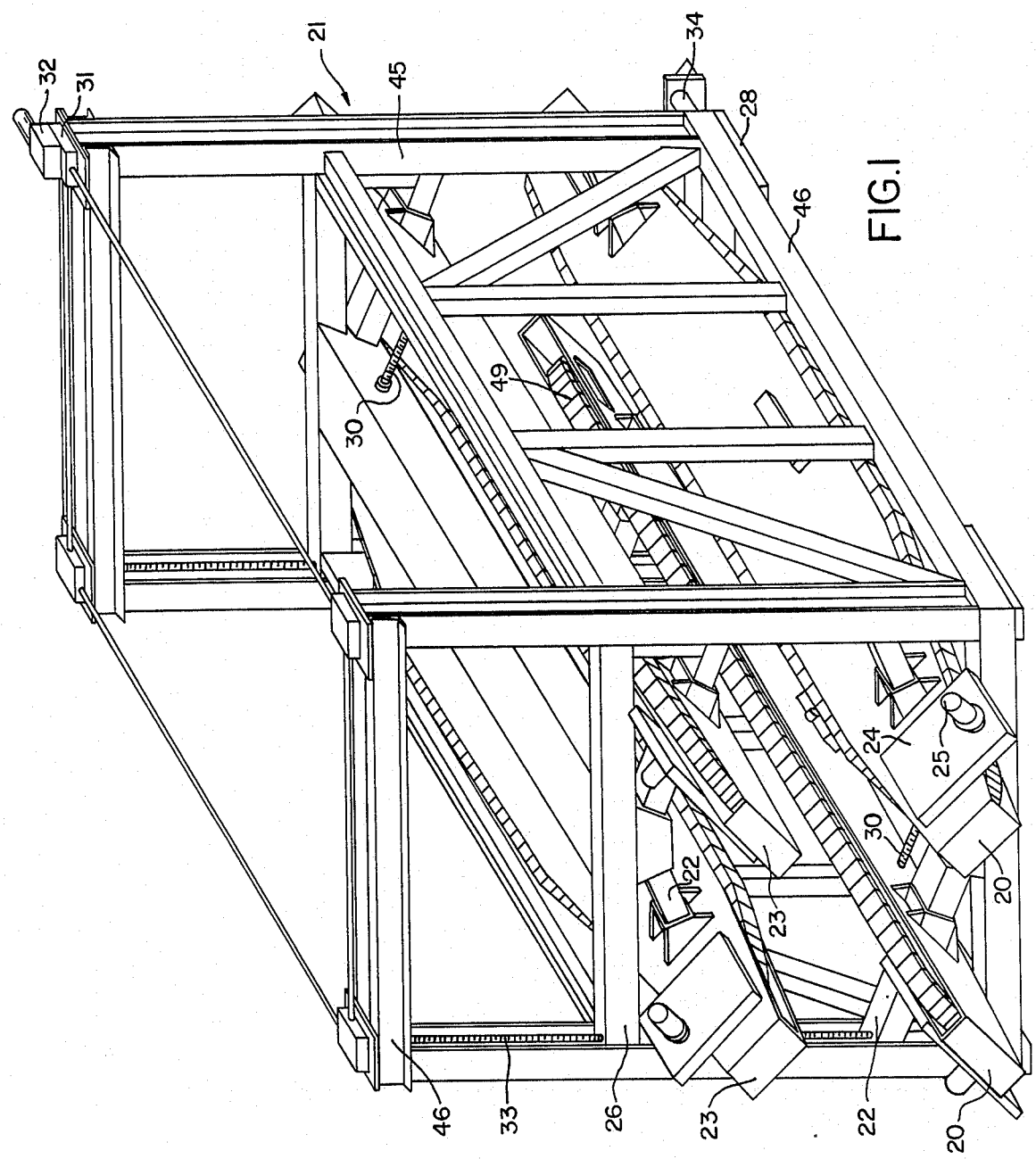
FIG. 1 shows a schematic representation of the pipe tensioner machine according to the invention in an isometric view.

The pipe tensioner machine shown in FIG. 1 comprises a main frame 21, being provided with vertical posts 45 at its four corners which are interconnected by horizontal bars 46. Additional diagonal bars provide a further stabilisation.

Figure 2:
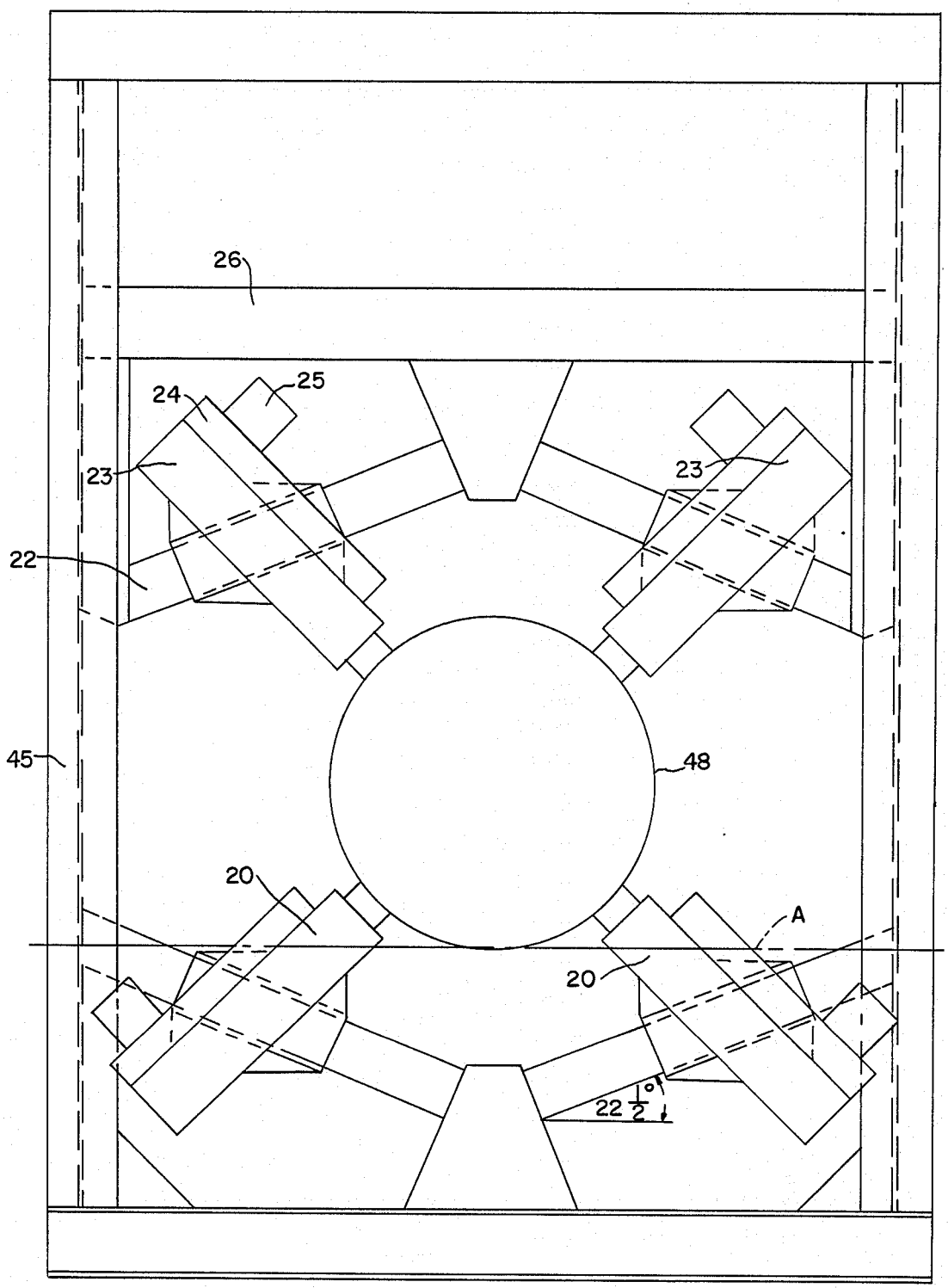
FIG. 2 shows a front view of the machine according to FIG. 1, squeezing a pipe of large diameter.
Figure 3:
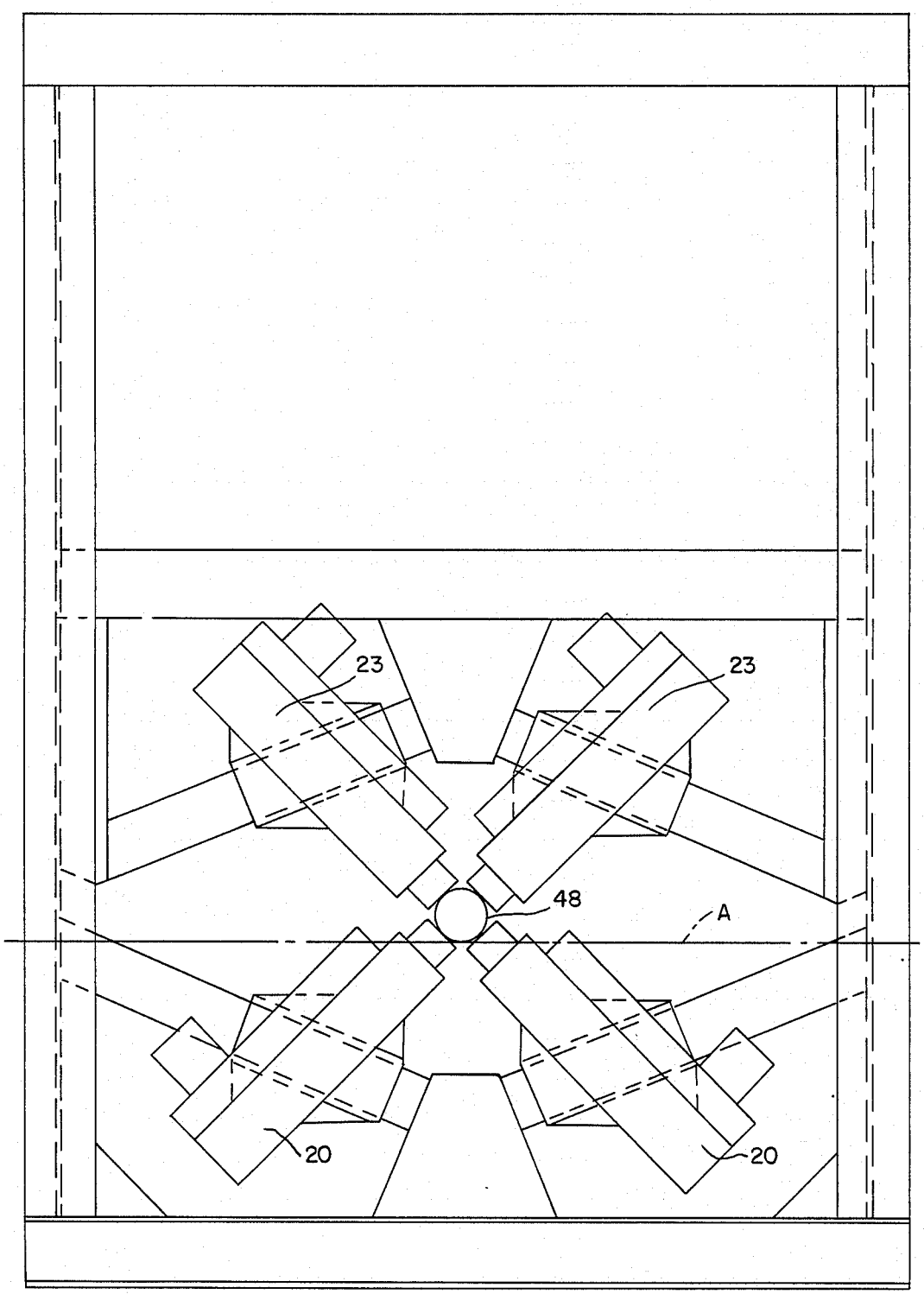
FIG. 3 shows the machine according to FIG. 2, squeezing a pipe of small diameter.

In the lower area of the main frame 21 there are mounted two lower tensionbanks 20, the inner structure of which will be explained in more details with respect to FIG. 5 further below. The tensionbanks comprise revolving track chains 49 which are provided with traction pads for engagement with pipe 48 (FIGS. 2 and 3). The tracks 49 are driven by a hydraulic motor 25 and gear reducer 24.

Figure 4:
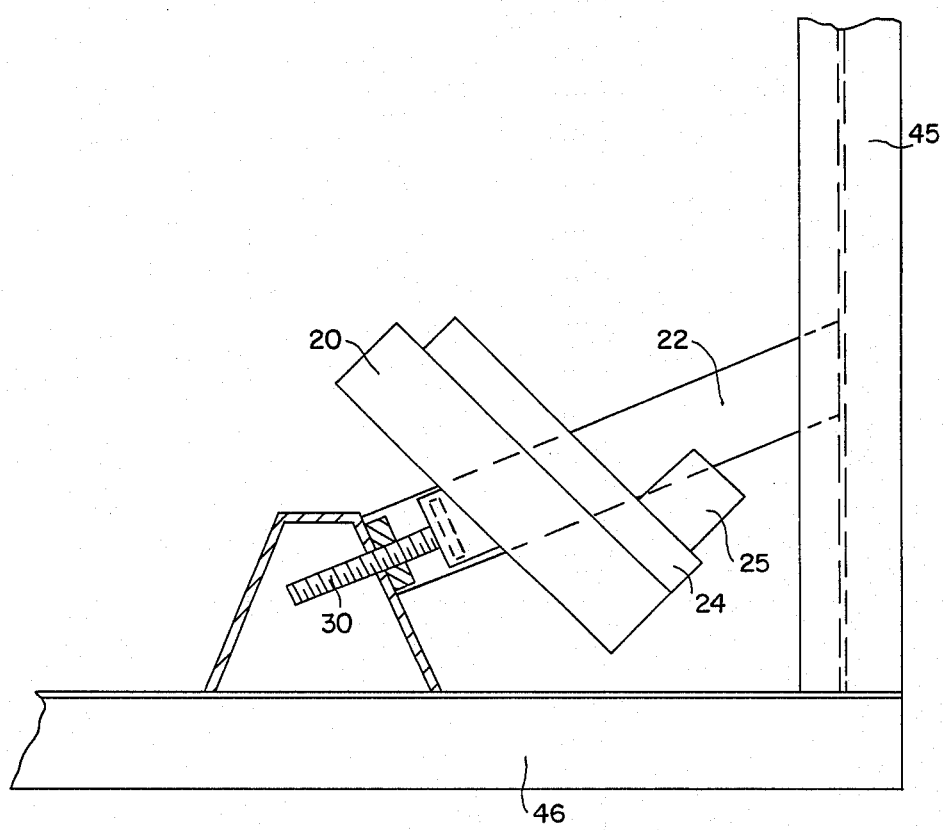
FIG. 4 shows the guide of a lower tensionbank in detail.

The tensionbanks 20 are, as depicted in FIG. 4 in a larger scale, moveable along guides 22 in order to adapt the same to another pipe diameter, held at the vertical posts 45 of the main frame 21. The adjustment is carried out through a jackscrew 30. The guides 22 are inclined with respect to the horizontal in an angle of 22.5°. This angle ensures that when adjusting the machine to the larger or smaller pipe diameter, the bottom of pipe is always maintained at the same level.

In the upper area of the main frame 21 there is provided an upper frame 26 which is mounted moveably in vertical direction. The vertical posts 45 of the main frame hold jackscrews 33 engaging nuts fixed to the upper frame 26. A motor with gear reducers 32 turn angle drive 31 and jackscrews 33 whereby the upper frame 26 is lifted or lowered, resp. The upper frame 26 is guided in vertical posts 45 of main frame 21.

On the upper frame 26 there are held upper tension banks 23 which are symmetric with respect to lower tension banks 20 and which are moveable in the same manner as the lower tension banks along guides 22. Also the guides for the upper tension banks 23 are inclined with respect to the horizontal by 22.5°. The movement is carried out in the same manner as this has been explained with respect to FIG. 4 through jackscrews 30. The inclination of all tension banks with respect to the horizontal is 45°. By a movement of the tensionbanks 20 or 23, resp., along the respective guides through jackscrews 30 and the vertical movement of the upper frame 26 through jackscrews 33, the tensioner may be quickly and readily adapted to practically any pipe diameter.

The total weight of the pipe tensioning machine rests on rubber pads 28 supporting main frame 21. The machine is loosely bolted to the deck to allow a minute longitudinal play, so that the machine can flex against loadcell 34.

The front views of the machine according to FIGS. 2 and 3 make clear the adaptation of the lower and the upper tensionbanks 20 or 23, resp., to different pipe diameters. Starting from a larger pipe diameter according to the representation in FIG. 2, the upper frame 26 is first lifted by turning jackscrews 33 in order to liberate pipe 48. Subsequently lower and upper tensionbanks 20 and 23 are moved to the inside along guides 22, while the upper frame 26 is lowered by turning the jackscrews 33 in opposite direction. Thus, the adjustment to a small pipe diameter as shown in FIG. 3 is already concluded. Reference line A shows that the bottom of pipe remains at the same level also after the adjustment to another pipe diameter.

Figure 5:
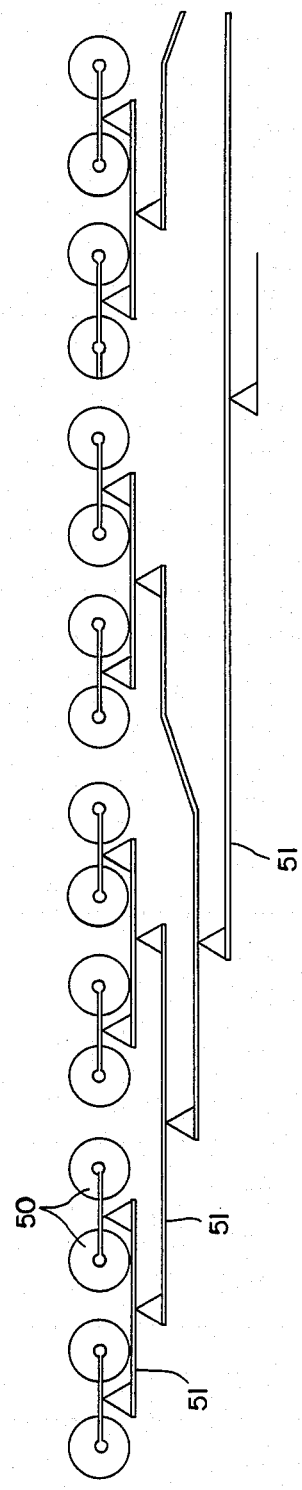
FIG. 5 shows the roller support of the track loop of a lower tensionbank in schematic representation and FIG. 6 shows the support and squeeze device of a track of an upper tensionbank also in schematic representation.

FIG. 5 shows the inner structure of the support of the lower tensionbanks 20 in schematic representation. Tracks 49 (FIG. 1) which have been left off the drawing for the sake of simplification are supported by support rollers 50 in pairs. A lever assembly 51 ensures an even transfer to the total load over the full length of the tracks 49.

Figure 6:
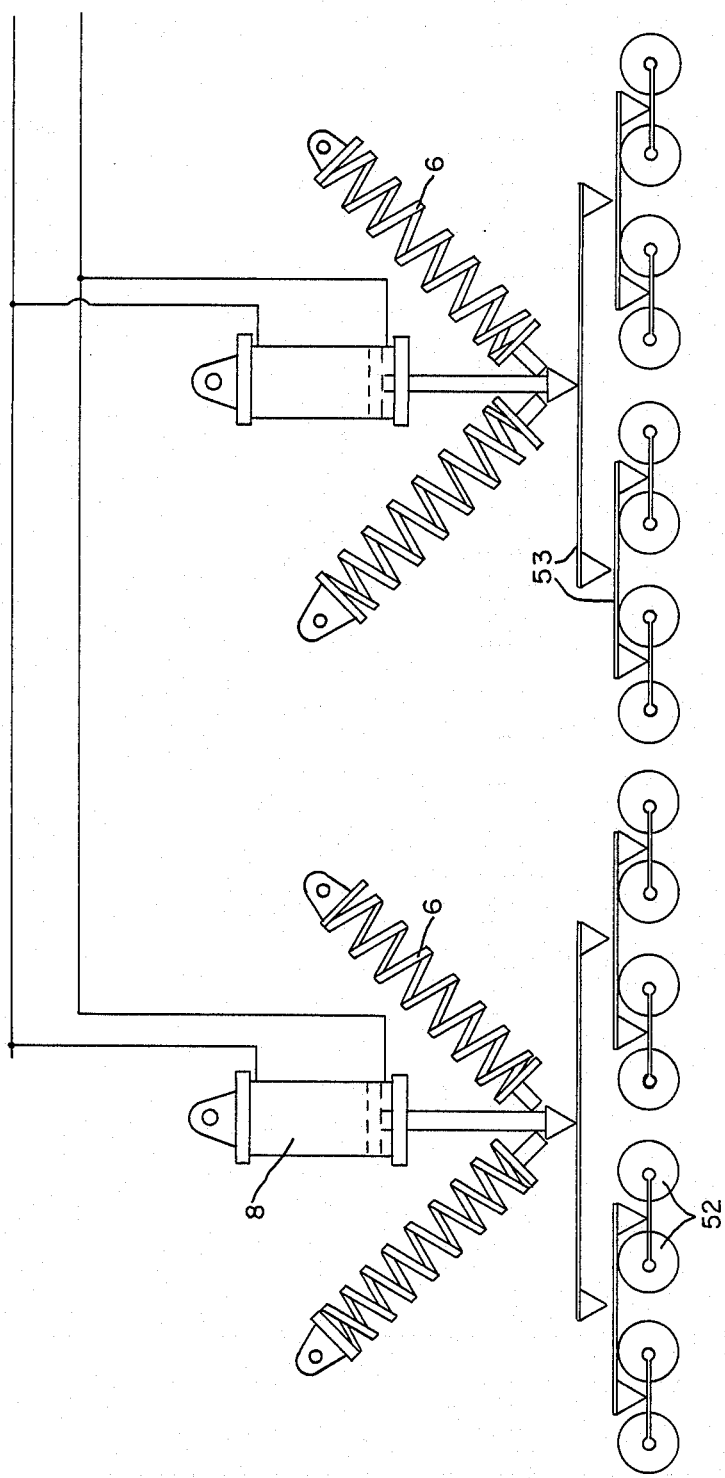

The support of the upper tracks is depicted in FIG. 6 also in schematic representation. There also support rollers 52 are provided in pairs which are supported by a lever assembly 53 for an even transfer of the load. In order to transfer the squeeze or clamping force there are, however, in contrast to the lower tensionbanks, provided force transfer devices for each group of the rollers 52 comprising a hydraulic cylinder 8 and V-arranged hellical springs 6. The piston rod of the hydraulic cylinder 8 is attached to the connection point of both hellical springs 6. Thus, there may be transferred a predetermined, adjustable and evenly distributed force through the upper tensionbanks 23 onto each pipe section 48.

Thus, there has been successfully provided a pipe tensioner machine permitting the transfer of a uniform tension, without destructing load for the pipes onto the pipe string with a secure grip which is quickly and readily adaptable to different pipe diameters. It is to be pointed out here that the above description is merely examplifying without limiting character and various amendments and modifications are possible without leaving the spirit of the invention.

I claim:

1. A pipetensioner machine for offshore pipe laying operations comprising: squeeze elements for transferring tension forces to a pipe, and a driving structure for said squeeze elements, said squeeze elements comprising four tensionbanks in an angle substantially 90 degrees to each other; a frame structure; said four tensionbanks being movable relative to each other by an adjustment device mounted within said frame structure, said frame structure comprising a main frame movably mounted to the lower of said tensionbanks and an upper frame movably mounted to the upper of said tensionbank, said upper frame being adjustable with respect to said main frame in a vertical direction.

2. Pipe tensioner machine according to claim 1, characterized in said adjustment device for said tension banks comprising guides adjusted in an angle of substantially 22.5° with respect to the horizontal.

3. Pipe tensioner machine according to claim 2, characterized in jackscrews engaging said tensionbanks and by a rotation of the jackscrews the tensionbanks are moveable along said guides.

4. Pipe tensioner machine according to claim 3, characterized in the vertical posts of said main frame housing jackscrews for moving the upper frame in relation to the main frame.

5. Pipe tensioner machine according to 1, characterized by said tensionbank comprising revolving tracks, driven by a hydraulic motor with gear reducer.

6. Pipe tension machine according to claim 5, characterized in the tracks being provided with traction pads.

7. The pipe tensioner machine according to claim 1 wherein said lower tensionbanks comprise lower trakcs and wherein a support of said lower tracks comprises support rollers, said rollers being evenly supported in individual groups by support levers.

8. The pipe tensioner machine according to claim 1 wherein said upper tensionbanks comprise upper tracks and wherein there is provided a squeezing device for the engagement of said upper tracks with a clamped pipe at a predetermined squeeze force.

9. Pipe tensioner machine according to claim 8, characterized in groups of support rollers being provided for supporting said upper tracks, said rollers being supported by levers, the support for said levers comprising V-arranged hellical springs and a hydraulic cylinder attached to the connecting point of said springs and mounted along the centerline of the V.

* * * * *